(12) United States Patent
Atkins

(10) Patent No.: US 11,739,271 B2
(45) Date of Patent: Aug. 29, 2023

(54) USING STIMULUS TO CONVERT COAL TO MESOPHASE PITCH AND CARBON FIBERS

(71) Applicant: CARBON HOLDINGS INTELLECTUAL PROPERTIES, LLC, Sheridan, WY (US)

(72) Inventor: Charles Agee Atkins, Sheridan, WY (US)

(73) Assignee: CARBON HOLDINGS INTELLECTUAL PROPERTIES, LLC, Sheridan, WY (US)

( * ) Notice: Subject to any disclaimer, the term of this patent is extended or adjusted under 35 U.S.C. 154(b) by 0 days.

(21) Appl. No.: 17/863,191

(22) Filed: Jul. 12, 2022

(65) Prior Publication Data
US 2023/0042044 A1 Feb. 9, 2023

Related U.S. Application Data

(63) Continuation of application No. 16/826,069, filed on Mar. 20, 2020, now Pat. No. 11,384,288.
(Continued)

(51) Int. Cl.
C10C 3/00 (2006.01)
C01B 32/184 (2017.01)
(Continued)

(52) U.S. Cl.
CPC ............. *C10C 3/002* (2013.01); *C01B 32/05* (2017.08); *C01B 32/154* (2017.08);
(Continued)

(58) Field of Classification Search
CPC .. C10C 3/002; C10C 1/19; C10C 1/16; C01B 32/05; C01B 32/154; C01B 32/184;
(Continued)

(56) References Cited

U.S. PATENT DOCUMENTS 3,991,170 A * 11/1976 Singer .................. C04B 35/522
208/22
4,590,055 A 5/1986 Yamada et al.
(Continued)

FOREIGN PATENT DOCUMENTS

CN 101580242 A 11/2009
CN 102229810 A 11/2011
(Continued)

OTHER PUBLICATIONS

English translation of CN 102229810 (Year: 2011).*
(Continued)

*Primary Examiner* — Randy Boyer
*Assistant Examiner* — Juan C Valencia
(74) *Attorney, Agent, or Firm* — Dorsey & Whitney LLP

(57) ABSTRACT

A method for forming mesophase pitch can include applying a stimulus to a first amount of coal tar to form a first amount of mesophase pitch. The stimulus can include one or more of an electromagnetic field ("EMF") or a magnetic field. The method can further include evaluating a characteristic of the first amount of mesophase pitch, changing a parameter of the stimulus in response to evaluating the characteristic of the first amount of mesophase pitch, and applying the stimulus exhibiting the changed parameters to a second amount of coal tar to form mesophase pitch.

19 Claims, 2 Drawing Sheets

Providing coal tar
102

↓

Applying at least one stimulus to the coal tar to form mesophase pitch
104

Related U.S. Application Data

(60) Provisional application No. 62/821,331, filed on Mar. 20, 2019.

(51) Int. Cl.
  *C01B 32/154* (2017.01)
  *C01B 32/26* (2017.01)
  *D01F 9/12* (2006.01)
  *C01B 32/05* (2017.01)
  *C10C 1/00* (2006.01)
  *C10C 1/04* (2006.01)
  *C10B 19/00* (2006.01)
  *C10B 53/04* (2006.01)
  *C10B 55/00* (2006.01)

(52) U.S. Cl.
  CPC ............ *C01B 32/184* (2017.08); *C01B 32/26* (2017.08); *C10B 19/00* (2013.01); *C10B 53/04* (2013.01); *C10B 55/00* (2013.01); *C10C 1/00* (2013.01); *C10C 1/04* (2013.01); *D01F 9/12* (2013.01)

(58) Field of Classification Search
  CPC ......... C01B 32/26; C10B 19/00; C10B 53/04; C10B 55/00; D01F 9/12; D01F 9/15
  See application file for complete search history.

(56) References Cited

U.S. PATENT DOCUMENTS

| | | |
|---|---|---|
| 2012/0076703 A1 | 3/2012 | Stiller et al. |
| 2012/0104659 A1 | 5/2012 | La et al. |
| 2013/0062186 A1 | 3/2013 | Rinker |
| 2015/0110703 A1 | 4/2015 | Targett et al. |
| 2019/0194544 A1 | 6/2019 | Atkins et al. |
| 2020/0299587 A1 | 9/2020 | Atkins et al. |

FOREIGN PATENT DOCUMENTS

| | | |
|---|---|---|
| EP | 0318843 A1 | 6/1989 |
| JP | S537533 A | 1/1978 |
| JP | S5386717 A | 7/1978 |
| JP | S5386718 A | 7/1978 |
| JP | S54160427 A | 12/1979 |
| JP | S5558287 A | 4/1980 |
| JP | S55130809 A | 10/1980 |
| JP | 4528013 B2 | 8/2010 |

OTHER PUBLICATIONS

International Search Report and Written Opinion for International Patent Application No. PCT/US2020/024039 dated Jun. 16, 2020, 8 pages.

Dunmar, et al., "Effect of Electric and Magnetic Fields on Orientation Disorder in Liquid Crystals", 1988.

\* cited by examiner

USING STIMULUS TO CONVERT COAL TO MESOPHASE PITCH AND CARBON FIBERS

CROSS-REFERENCE TO RELATED APPLICATION

This application claims priority to U.S. Provisional Application No. 62/821,331 filed on Mar. 20, 2019, the disclosure of which is incorporated herein, in its entirety, by this reference.

FIELD

The described embodiments relate generally to carbon based processing methods. More particularly, the present embodiments relate to systems and methods for using stimulus (e.g., electromagnetic fields (EMF) and/or magnetic fields) to convert coal to mesophase pitch and carbon fibers.

BACKGROUND

As is well known, for example in U.S. Pat. No. 4,590,055, the carbon fibers currently produced and widely used are classified into two categories according to the starting material, i.e. the PAN (polyacrylonitrile)-based carbon fibers prepared by the carbonization of polyacrylonitrile fibers and the pitch-based carbon fibers prepared from pitches of coal- or petroleum-origin.

Despite the advantages of the pitch-based carbon fibers due to their inexpensiveness, the PAN-based carbon fibers occupy the major current of the industrial high-performance carbon fibers having high mechanical strength and high modulus suitable for reinforcing various composite materials. This is partly due to the tensile strength of the pitch-based carbon fibers being industrially produced being relatively low and limited to 200 kg/mm$^2$ or below.

Various attempts have been made to develop high-performance carbon fibers starting from inexpensive pitch compositions. The properties of the starting pitch is one of the most important factors for obtaining high-performance pitch-based carbon fibers. Recently, several proposals have been made for preparing a pitch composition suitable for forming high-performance carbon fibers, including (a) a method in which a specific condensed polycyclic aromatic compound is subjected to a heat treatment or treatment in hydrogen (see, for example, Japanese Patent Publication Nos. 45-28013 and 49-8634); (b) a method in which a mesophase pitch is obtained by subjecting a tar or pitch of petroleum origin to a first heat treatment in the presence of a Lewis acid catalyst followed by a second heat treatment after removal of the catalyst (see, for example, Japanese Patent Publication No. 53-7533); (c) a method in which a mesophase pitch having a desired mesophase content is obtained by the heat treatment of a pitch in an atmosphere of a flowing inert gas or under a reduced pressure (see, for example, Japanese Patent Kokai Nos. 53-86717 and 53-86718); and (d) a method in which an optically isotropic pitch is subjected to a treatment with an organic solvent, e.g. benzene, toluene, and heptane, and the insoluble fraction is heated to form neomesophase (see, for example, Japanese Pat. Nos. Kokai 54-160427, 55-58287 and 55-130809).

Unfortunately, the above described methods are not effective enough to result in a pitch composition suited for the formation of high-performance carbon fibers having a tensile strength comparable to the PAN-based carbon fibers. Therefore, the actual application of carbon fibers prepared from an isotropic pitch is limited to those fields in which particularly high tensile strength is not required, such as reinforcement in asbestos substitutes. The mesophase pitch produced in some of the above described methods are limited in practical manufacturing processes due to their relatively high viscosity and poor spinnability, causing a difficulty in melt spinning at an economically feasible velocity. Consequently, it is desirable to provide a more economical method for producing coal based mesophase pitch for the production of carbon fibers with sufficiently high tensile strength.

SUMMARY

Embodiments disclosed herein relate to processes of using at least one stimulus to synthesize mesophase pitch which can be used as a carbon-fiber precursor. The stimulus includes at least one of an electromagnetic field ("EMF") or a magnetic field. In one example process, coal tar is continuously provided and a stimulus is applied to the coal tar to form the mesophase pitch from the coal tar. The stimulus applied to the coal tar can exhibit various parameters to expose the coal tar to various electric fields, magnetic field strengths, and/or magnetic flux densities. In one embodiment, the resulting mesophase pitch can be spin-ready.

In one embodiment, a method is disclosed. The method includes providing coal tar and applying at least one stimulus to the coal tar to form mesophase pitch. The at least one stimulus includes at least one of an electromagnetic field ("EMF") or a magnetic field.

In some embodiments of the method, providing the coal tar includes forming the coal tar by reducing the particle size of provided coal to form coal powder, sieving the coal powder, pyrolyzing the coal, extracting the coal tar from the pyrolyzed coal, and/or distilling the coal tar to remove one or more contaminants therefrom.

In some embodiments of the method, the at least one stimulus includes the EMF.

In some embodiments of the method, the EMF exhibits a wavelength of about 1 mm to about 1 m.

In some embodiments of the method, the EMF includes a pulsed EMF.

In some embodiments of the method, applying the EMF to the coal tar includes applying an EMF exhibiting a first property to the coal tar and, after applying the EMF exhibiting the first property, applying an EMF exhibiting a second property that is different than the first property. The first property and the second property are at least one of the wavelength or intensity of the EMF.

In some embodiments of the method, the at least one stimulus includes the magnetic field.

In some embodiments of the method, applying the magnetic field to the coal tar includes varying a magnetic field strength of the magnetic field.

In some embodiments of the method, applying the at least one stimulus to the coal tar includes heating the coal tar to a temperature of about 100° C. to about 300° C.

In some embodiments of the method, the method further includes evaluating one or more characteristics of the coal tar or the mesophase pitch and, responsive to evaluating the one or more characteristics of the coal tar or the mesophase pitch, changing one or more parameters of the at least one stimulus that is applied to the coal tar.

In some embodiments of the method, the method further include forming the mesophase pitch into carbon fiber.

In some embodiments of the method, the method further includes air blowing the mesophase pitch.

In some embodiments of the method, the method further includes subjecting the mesophase pitch to a thermal process.

In one embodiment, a method is disclosed. The method includes evaluating one or more characteristics of coal tar or coal used to form the coal tar. The method also includes, responsive to the evaluation, selecting one or more parameters of at least one stimulus that is to be applied to the coal tar. The method further includes applying the at least one stimulus exhibiting the one or more parameters to the coal tar to form mesophase pitch. The at least one stimulus includes at least one of an EMF or a magnetic field.

In some embodiments of the method, the at least one stimulus includes EMF and selecting one or more parameters of the at least one stimulus includes selecting at least one of a wavelength, an intensity, or mode of the EMF.

In some embodiments of the method, the EMF exhibits a wavelength of about 1 mm to about 1 m.

In some embodiments of the method, the at least one stimulus includes a magnetic field and selecting one or more parameters of the at least one stimulus includes selecting at least one of a magnetic field strength or mode of the magnetic field.

In one embodiment, a method is disclosed. The method includes providing coal tar and applying at least one stimulus to the coal tar to form mesophase pitch. The at least one stimulus includes at least one of an EMF or a magnetic field. The method further includes evaluating one or more characteristics of the mesophase pitch and, responsive to the evaluation, changing one or more parameters of the at least one stimulus. Additionally, the method includes applying the at least one stimulus exhibiting the one or more parameters to subsequently provided coal tar.

In some embodiments of the method the at least one stimulus includes EMF and selecting one or more parameters of the at least one stimulus includes selecting at least one of a wavelength, an intensity, or mode of the EMF.

In some embodiments of the method the at least one stimulus includes a magnetic field and selecting one or more parameters of the at least one stimulus includes selecting at least one of a magnetic field strength or mode of the magnetic field.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
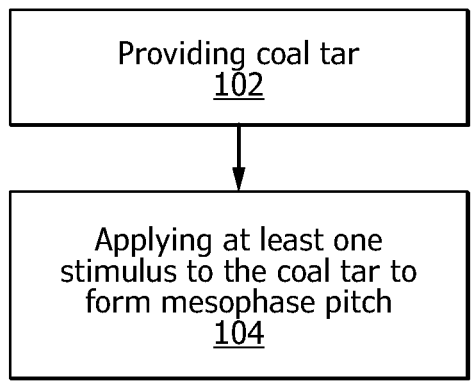
FIG. 1 is a flow chart of a method of forming mesophase pitch from coal.

Embodiments disclosed herein relate to processes of using at least one stimulus to synthesize mesophase pitch which can be used as a carbon-fiber precursor. The stimulus includes at least one of an electromagnetic field ("EMF") or a magnetic field. In one example process, coal tar is provided and a stimulus is applied to the coal tar to form the mesophase pitch from the coal tar. In some examples, heat or thermal energy can also be applied to the coal tar along with the stimulus. That is, in some examples, the stimulus can be applied to coal tar that has been heated to a desired temperature. The stimulus applied to the coal tar can exhibit various parameters to expose the coal tar to various electric fields, magnetic field strengths, and/or magnetic flux densities. In one example, the resulting mesophase pitch can be spin-ready.

The exposure of the coal tar, or other coal-derived precursor materials to a stimulus such as an electric field and/or magnetic field can allow for the formation of pitch including desired carbon product precursors, such as one or more specific aromatic precursor chemicals, at relatively high levels of purity at lower processing temperatures and/or reduced times as compared to convention thermally-based processes. Advantageously, the formation of pitch including desired precursor molecules at high levels of purity without the need for high temperature or long processing times can enable the processes described herein to be run or performed in a continuous reactor, further decreasing the cost of forming mesophase pitch from coal and the carbon products derived therefrom.

In one embodiment, providing the coal tar includes forming the coal tar prior to applying the stimulus to the coal tar. Forming the coal tar can include one or more steps of preparing coal, pyrolyzing or otherwise modifying the coal to form the coal tar, or distilling the coal tar to remove one or more impurities therefrom.

In one embodiment, after forming the mesophase pitch, the process can also include forming the mesophase pitch into one or more carbon products, such as graphene, fullerene, diamond, and/or carbon fibers. In some examples, forming the mesophase pitch into carbon fibers can include one or more of spinning the mesophase pitch into fibers, stabilizing the fibers, carbonizing the fibers, or graphitizing the fibers. In some examples, the mesophase pitch formed by the processes described herein can be used as a precursor to form allotropes of carbon including covalently bonded monolayers of carbon atoms arranged in hexagonal or aromatic structures. In some examples, the mesophase pitch formed by the processes described herein can be used as a precursor to produce carbon sheets that have delocalized $sp^2$ hybridized pi-bonding within the sheet. By applying a stimulus having desired parameters to coal tar as described herein, mesophase pitch can be produced that includes properties that allow it to serve as a precursor for the easy and efficient formation of desired carbon products. As a result, the mesophase pitch including the desired component molecules at desired purities can allow for the formation of carbon products with desired properties. For example, mesophase pitch formed from coal by the processes described herein can be used to produce graphene or other carbon products that have thermal conductivities up to about 5300 W/m K, that have electrical conductivities similar to conductivities achieved with electron tunneling, that have mechanical strengths over 100 gigapascals (GPa), that have moduli over 2 terapascals (TPa), and that can exhibit up to 20% elongation.

In one embodiment, the process can further include evaluating a product. The product evaluated can include one or more of the provided coal, the coal tar, the mesophase pitch, the carbon product, or any intermediate product formed during the processes disclosed herein. Evaluating the product can adjust the process. In one example, the parameters of the stimulus applied to the coal tar can be adjusted based on evaluating the coal and/or coal tar in order to produce a mesophase pitch having a desired composition and/or purity. In some examples, the parameters of the stimulus can be selected to produce a mesophase pitch or other carbon product precursor material that has a desired set of properties for forming specific carbon products therefrom. In one example, the parameters of the stimulus can be adjusted based on evaluating the mesophase pitch or the carbon product formed from the coal tar and a stimulus having these adjusted parameters can be applied to subsequently provided coal tar in a substantially continuous manner, such as in a plant based setting.

For example, the magnetic behavior of specific component molecules or chemicals, such as aromatic molecules that are desired for use in the formation of graphene, can be evaluated and parameters of the stimulus can be selected to efficiently produce a mesophase pitch from coal tar or other coal-derived material that includes these component molecules or chemicals at relatively high levels of purity.

Without wishing to be bound by any one theory, it is believed that the application of a stimulus to coal tar or other coal-derived precursors can influence the behavior of the coal tar during a pitch formation process as described herein. In the example of a stimulus including a magnetic field, the application of the magnetic field to the coal tar can have a thermodynamic effect and can increase the Gibbs free energy available for polymerization reactions or other desired reactions that occur during pitch formation. Further, the magnetic field can increase the effective pressure of the coal tar, increasing reaction speeds. The Zeeman effect can also include the bonding and crystal structure of the molecules formed during the conversion of coal tar to mesophase pitch.

FIG. 1 is a flow chart of a method 100 of forming mesophase pitch, according to one example. The mesophase pitch formed according to the method 100 can be suitable for forming carbon fiber, graphene, fullerene, diamond, or other carbon products described herein. As shown in FIG. 1, the method 100 includes act 102, which includes providing coal tar. The method 100 also includes act 104, which includes applying at least one stimulus to the coal tar to form the mesophase pitch.

Act 102 includes providing coal tar. In one embodiment, act 102 includes providing pre-formed coal tar. In such one embodiment, the method 100 does not include processing the coal tar and, instead, the method 100 includes proceeding straight to act 104. In one embodiment, as discussed in more detail with regards to FIG. 2, act 102 can include forming the coal tar. In such one embodiment, the method 100 can include performing one or more processes to form the coal tar before proceeding to act 104. In some examples, act 102 can include providing coal, such as anthracite coal and/or coal extracted from Wyoming's Powder River Basin.

Act 104 includes applying at least one stimulus to the coal tar to form the mesophase pitch. The stimulus applied to the coal tar includes at least one of EMF or a magnetic field. Applying the stimulus to the coal tar can increase the molecular weight of the coal tar (e.g., polymerizes the coal tar) in a desired and controlled manner to form the mesophase pitch. The stimulus efficiently and economically synthesizes the coal tar into the mesophase pitch that can then be used in the production of carbon fibers. For example, the stimulus can minimize the overall processing cost by reducing processing times and temperatures required to form the mesophase pitch while assuring the mesophase pitch has the chemical and physical characteristics to produce desired carbon products, such as carbon fibers or graphene.

In some examples, the stimulus can be applied to coal tar that has been heated to a desired temperature or range of temperatures. In some examples, the coal tar or other coal-derived precursor can be heated to a temperature of at least about 30° C., at least about 40° C., at least about 50° C., at least about 60° C., at least about 70° C., at least about 80° C., at least about 90° C., at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., at least about 290° C., at least about 300° C., at least about 325° C., at least about 350° C., at least about 375° C., at least about 400° C., or at least about 500° C. or greater. In some examples, and as described herein, the application of the stimulus to the coal tar can allow for the formation of mesophase pitch having desired properties without the need to heat the coal tar as much or as long as would be required in conventional processes.

In some examples, the application of the stimulus to the coal tar at act 104 can be carried out in the presence of one or more catalysts, solvents, or other chemicals. That is, the coal tar can be combined or mixed with one or more catalysts or solvents and then the stimulus can be applied to the mixture comprising the coal tar. In some examples, a solvent can include one or more of N-Methyl-2-pyrrolidone (NMP), quinoline, fluorinert FC-71, silicone oils, phthalates such as dioctyl phthalate, syltherm 800, or any other suitable solvent or carrier. Additionally, in some examples, the coal tar can be combined with a catalyst that can enhance the effect of the stimulus on the coal tar and can provide for more efficient converions into mesophase pitch having desired properties. In some examples, the catalyst can include a lewis acid. In some examples, such as where the stimulus includes a magnetic field, the catalyst can include one or more of a magnetic lewis acid or a non-magnetic lewis acid. In some examples, substantially any lewis acid can be used. In some examples, the lewis acid can include a metal chloride, such as iron chloride and/or aluminum chloride.

Act 104 can include positioning the coal tar in a chamber. The chamber can be formed from a closed container, an open container, or any other device that can hold the coal tar. The chamber can include at least one stimulus source. The stimulus source can be disposed in the chamber. In one embodiment, the stimulus source is an EMF source. The EMF source can include at least one black light, at least one curing lamp, at least one germicidal lamp, at least one mercury vapor lamp, at least one halogen lamp, at least one high-intensity discharge lamp, at least one fluorescent lamp, at least one incandescent lamp, at least one laser, at least one light emitting diode (LED), or any other suitable light source. In one embodiment, the stimulus source is a magnetic field source. The magnetic field source can include a permanent magnet or, more preferably, an electromagnet since the parameters of the electromagnet can be easily changed.

In one embodiment, the chamber can include at least one agitator configured to mix the coal tar. The agitator can ensure that the coal tar is exposed such that the coal tar is exposed equally or substantially equally to the stimulus. For example, the stimulus can be applied preferentially to certain regions of the chamber relative to other regions of the chamber and/or the coal tar may not be perfectly permeable to the stimulus (e.g., the coal tar absorbs, reflects, or is otherwise partially impermeable to the stimulus). The agitator ensures that the coal tar is substantially equally exposed to the stimulus, even when the stimulus is applied preferentially to certain regions of the chamber and/or the coal tar is not perfectly permeable to the stimulus In one embodiment, the stimulus applied to the coal tar is an EMF. The EMF applied to the coal tar can exhibit a variety of parameters. For example, the parameters can include the wavelength of the EMF, the intensity of the EMF, the modes of the EMF, duration that the EMF is applied to the coal tar, etc. The parameters of the EMF can affect how effectively the EMF changes the coal tar to the mesophase pitch.

The wavelength of the EMF applied to the coal tar can be ultraviolet light. In one example, the wavelength of the EMF can be about 10 nm to about 400 nm (ultraviolet light), such as in ranges of about 10 nm to about 121 nm (extreme ultraviolet light), about 122 nm to about 200 nm (far ultraviolet light), about 200 nm to about 300 nm (middle ultraviolet light), about 300 nm to about 400 nm (near ultraviolet light), about 100 nm to about 280 nm (hard ultraviolet light), about 280 nm to about 315 nm (intermediate ultraviolet light), or about 315 nm to about 400 nm (soft ultraviolet light). In one example, the wavelength of the EMF can be about 400 nm to about 700 nm (visible light) or about 700 nm to about 1 mm (infrared light), such as in ranges of about 750 nm to about 1.4 μm (near-infrared), about 1.4 μm to about 3 μm (short-wavelength infrared), about 3 μm to about 8 μm (mid-wavelength infrared), about 8 μm to about 15 μm (long-wavelength infrared), or about 15 μm to about 1 mm (far infrared). In one example, the wavelength of the EMF can be about 1 mm to about 1 m (microwave), such as in ranges of about 1 mm to about 10 mm, about 5 mm to about 50 mm, about 10 mm to about 100 mm, about 50 mm to about 500 mm, or about 100 mm to about 1 m.

The wavelength of the EMF can be selected based on several factors. In one example, the wavelength of the EMF can be selected based on whether the EMF is configured to heat the coal tar by having one or more constituents of the coal tar absorb the EMF or be excited by the EMF. In one example, the wavelength of the EMF can be selected based on whether the EMF is configured to cause a curing chemical reaction, a chemical reaction caused by heating the coal tar, and/or a physical reaction of one or more constituents of the coal tar. In one example, the wavelength of the EMF can be selected based on one or more characteristics of the coal tar, such as the average molecular weight of the pitch present in the coal tar, the composition of the coal tar, the source of the coal tar, etc. For instance, the coal tar can react differently to different wavelengths of the EMF, depending on the characteristics of the coal tar. As such, the wavelength of the EMF can vary depending on the characteristics of the coal tar.

The intensity of the EMF applied to the coal tar can be about 100 μW/cm$^2$ or more, about 250 μW/cm$^2$ or more, about 500 μW/cm$^2$ or more, about 750 μW/cm$^2$ or more, about 1 mW/cm$^2$ or more, about 2.5 mW/cm$^2$ or more, about 5 mW/cm$^2$ or more, about 7.5 mW/cm$^2$ or more, about 10 mW/cm$^2$ or more, about 25 mW/cm$^2$ or more, about 50 mW/cm$^2$ or more, about 100 mW/cm$^2$ or more, about 250 mW/cm$^2$ or more, about 500 mW/cm$^2$ or more, about 750 mW/cm$^2$ or more, about 1 W/cm$^2$ or more, or in ranges of about 100 μW/cm$^2$ to about 500 μW/cm$^2$, about 250 μW/cm$^2$ to about 750 μW/cm$^2$, about 500 μW/cm$^2$ to about 1 mW/cm$^2$, about 750 μW/cm$^2$ to about 2.5 mW/cm$^2$, about 1 mW/cm$^2$ to about 5 mW/cm$^2$, about 2.5 mW/cm$^2$ to about 7.5 mW/cm$^2$, about 5 mW/cm$^2$ to about 10 mW/cm$^2$, about 7.5 mW/cm$^2$ to about 25 mW/cm$^2$, about 10 mW/cm$^2$ to about 50 mW/cm$^2$, about 25 mW/cm$^2$ to about 75 mW/cm$^2$, about 50 mW/cm$^2$ to about 100 mW/cm$^2$, about 75 mW/cm$^2$ to about 250 mW/cm$^2$, about 100 mW/cm$^2$ to about 500 mW/cm$^2$, about 250 mW/cm$^2$ to about 750 mW/cm$^2$, or about 500 mW/cm$^2$ to about 1000 W/cm$^2$. The intensity of the EMF can determine whether the coal tar converts into mesophase pitch or another compound. For example, an intensity of EMF too great can cause the coal tar to form ash while an intensity of the EMF too low can form mesophase pitch with poor qualities. Whether the intensity of the EMF is too great or too low can depend on the characteristics of the coal and the wavelength of the EMF. As such, the intensity of the EMF can be selected based on the characteristics of the coal tar and the intensity of the EMF.

The duration that the EMF is applied to the coal tar can be about 1 second or greater, such as in ranges of about 1 second to about 1 minute, about 30 seconds to about 5 minutes, about 1 minute to about 10 minutes, about 5 minutes to about 25 minutes, about 20 minutes to about 40 minutes, about 30 minutes to about 1 hour, about 40 minutes to about 2 hours, about 1 hour to about 3 hours, about 2 hours to about 4 hours, about 3 hours to about 6 hours, about 4 hours to about 8 hours, about 6 hours to about 12 hours, or greater than about 9 hours, or any desired length of time. The duration that the EMF is applied to the coal tar can depend on several factors. In one example, the duration that the EMF is applied to the coal tar can be selected based on the wavelength of the EMF and/or the intensity of the EMF since how long it takes to convert at least most of the coal tar into mesophase pitch and/or incidently convert some of the mesophase pitch into another compound (e.g., ash) depends on the wavelength and intensity of the EMF. In one example, the duration that the EMF is applied to the coal tar can depend on the characteristics of the coal tar since the characteristics of the coal tar affect how long it takes to convert at least most of the coal tar into mesophase pitch and/or incidently convert some of the mesophase pitch into another compound. The duration that the EMF is applied to the coal tar can depend on the amount of the coal tar exposed to the EMF, whereas increasing the quantity of the coal tar can increase the duration that the EMF is applied to the coal tar.

In one embodiment, the mode of the EMF applied to the coal tar can be a pulsed EMF which can decrease the energy expended to convert the coal tar into mesophase pitch or non-pulsed (e.g., constant) EMF which can convert the coal tar into mesophase pitch quicker than the pulsed EMF. In one embodiment, the mode of the EMF applied to the coal tar can include varying the wavelength of the EMF applied to the coal tar. For example, the EMF can initially exhibit a first wavelength and can then be changed to a second wavelength that is different than the first wavelength. After the second wavelength, the EMF can change back to the first wavelength or a third wavelength that is different than the first and second wavelengths. The first, second, and third wavelengths can include any of the wavelengths (or ranges of wavelengths) disclosed herein. Varying the wavelengths of the EMF can make converting the coal tar to the mesophase pitch quicker and/or more efficient. In one example, the first wavelength can more efficiently convert pure coal tar into mesophase pitch while the second wavelength can more efficiently convert a mixture of coal tar and mesophase pitch into mesophase pitch. In one example, the different wavelengths can convert different constituents of the coal tar into mesophase pitch. In one example, the first wavelength can be selected to convert the coal tar into mesophase pitch and the second wavelength can cause the mesophase pitch to exhibit certain properties. In one embodiment, the mode of the EMF applied to the coal tar can include varying the intensity of the coal tar. For example, the EMF can exhibit a first intensity followed by a second intensity that is different than the first intensity and then, optionally, switch back to the first intensity or a third intensity that is different than the first and second intensities. Similar to varying the wavelength of the EMF, varying the intensity of the EMF can allow for the conversion of different constituents of the coal tar into mesophase pitch, causing the mesophase to exhibit certain properties, or otherwise make converting the coal tar into mesophase pitch quicker and more efficient.

In one embodiment, the stimulus applied to the coal tar is a magnetic field. The magnetic field applied to the coal tar can exhibit many parameters. For example, the parameters can include the magnetic field strength (i.e., the H-field), the modes of the magnetic field when the magnetic field source is an electromagnet, duration that the magnetic field is applied to the coal tar, etc. The parameters of the magnetic field can affect how effectively the magnetic field changes the coal tar to the mesophase pitch.

The magnetic field strength of the magnetic field applied to the coal tar can be about 5 milliteslas ("mT") or greater, about 10 mT or greater, about 50 mT or greater, about 100 mT or greater, about 200 mT or greater, about 500 mT or greater, about 1 tesla ("T") or greater, about 2 T or greater, about 3 T or greater, about 4 T or greater, about 5 T or greater, about 7.5 T or greater, about 10 T or greater, or in ranges of about 5 mT to about 50 mT, about 10 mT to about 100 mT, about 50 mT to about 200 mT, about 100 mT to about 500 mT, about 200 mT to about 1 T, about 500 mT to about 2 T, about 1 T to about 3 T, about 2 T to about 4 T, about 3 T to about 5 T, about 4 T to about 7.5 T, about 5 T to about 10 T, or about 7.5 T to about 15 T. In some examples, the magnetic field strength can be about 1 T, about 2 T, about 3 T, about 4 T, about 5 T, about 6 T, about 7 T, about 8 T, about 9 T, about 10 T, about 11 T, about 12 T, about 13 T, about 14 T, about 15 T, or about 20 T, The magnetic field strength of the magnetic field can be selected based on several factors. In one example, the magnetic field strength of the magnetic field can be selected based on whether the magnetic field is configured to heat the coal tar, cause a curing chemical reaction, cause another type of chemical reaction, and/or cause a physical reaction. In one example, the magnetic field strength of the magnet can be selected based on one or more characteristics of the coal tar, such as the average molecular weight of the pitch present in the coal tar, the composition of the coal tar, the source of the coal tar, etc. For instance, the coal tar can react differently to different magnetic field strengths, depending on the characteristics of the coal tar.

When the magnetic field source is an electromagnet, the magnetic field can exhibit one or more modes. In one embodiment, the mode of the magnet field can include applying a constant magnetic field to the coal tar. In one embodiment, the mode of the magnet field can include applying an alternative magnetic field or a pulsed magnetic field. In one embodiment, the mode of the magnetic field applied to the coal tar can include varying the magnetic field strength of the magnetic field applied to the coal tar. For example, the magnetic field can initially exhibit a first magnetic field strength, and then can be changed to a second magnetic field strength that is different than the first magnetic field strength. After the second magnetic field strength, the magnetic field can change back to the first magnetic field strength or to a third magnetic field strength that is different than the first and second magnetic field strengths. The first, second, and possibly third magnetic field strengths can include any of the magnetic field strengths (or ranges of magnetic field strengths) disclosed herein. Varying the magnetic field strength of the magnetic can make converting the coal tar to the mesophase pitch quicker and/or more efficient and can result in the formation of mesophase pitch having a desired composition and/or desired purity. In one example, the first magnetic field strength can more efficiently convert pure coal tar into mesophase pitch while the second magnetic field strength can be more efficient convert a mixture of coal tar and mesophase phase pitch into mesophase pitch. In one example, the different magnetic field strengths can convert different constituents of the coal tar into mesophase pitch. In one example, the first magnetic field strength can be selected to convert the coal tar into mesophase pitch and the second magnetic field strength can cause the mesophase pitch, and resulting products formed of the mesophase pitch, to exhibit certain properties.

The duration that the magnetic field is applied to the coal tar can be about 1 second or greater, such as in ranges of about 1 second to about 1 minute, about 30 seconds to about 5 minutes, about 1 minute to about 10 minutes, about 5 minutes to about 25 minutes, about 20 minutes to about 40 minutes, about 30 minutes to about 1 hour, about 40 minutes to about 2 hours, about 1 hour to about 3 hours, about 2 hours to about 4 hours, about 3 hours to about 6 hours, about 4 hours to about 8 hours, about 6 hours to about 12 hours, or greater than about 9 hours. The duration that the magnetic field is applied to the coal tar can depend on several factors. In one example, the duration that the magnetic field is applied to the coal tar can be selected based on the magnetic field strength. The duration of time necessary to convert at least most of the coal tar into mesophase pitch and/or incidently convert some of the mesophase pitch into another compound (e.g., ash) depends at least partially on the magnetic field strength. In one example, the duration that the magnetic field is applied to the coal tar can depend on the characteristics of the coal tar since the characteristics of the coal tar affect how long it takes to convert at least most of the coal tar into mesophase pitch and/or incidently convert some of the mesophase pitch into another compound. The duration that the magnetic field is applied to the coal tar can depend on the amount of the coal tar exposed to the magnetic field, wherein increasing the quantity of the coal tar can increase the duration that the magnetic field is applied to the coal tar.

In one embodiment, the stimulus applied to the coal tar includes both an EMF and a magnetic field. Applying both the EMF and the magnetic field to the coal tar can make the process more cost and/or energy efficient, decrease the time that the stimulus is applied to the coal tar, and/or form mesophase pitch exhibiting more beneficial properties if only one of the EMF or the magnetic field is applied to the coal tar.

The temperature that the coal tar is heated to during act 104 can vary. Varying the temperature of the coal tar can allow act 104 to more effectively change the coal tar to mesophase pitch. For example, the coal tar can be initially heated to a first temperature. The first temperature can include any of the temperatures disclosed herein. The temperature of the coal tar can subsequently be heated or cooled to a second temperature that is different than the first temperature. The second temperature can include any of the temperatures disclosed herein. Changing the temperature of the coal tar from the first temperature to the second temperature can optimize the method 100. For example, a product of the method 100 can be evaluated. Act 104 can change the temperature of the coal tar from the first temperature to the second temperature when, for instance, the evaluation determines that changing the temperature of the coal tar can make act 104 more efficient or produce better carbon fibers. It is noted that act 104 can include changing the temperature of the coal tar between many temperatures, without limitation.

Figure 2:
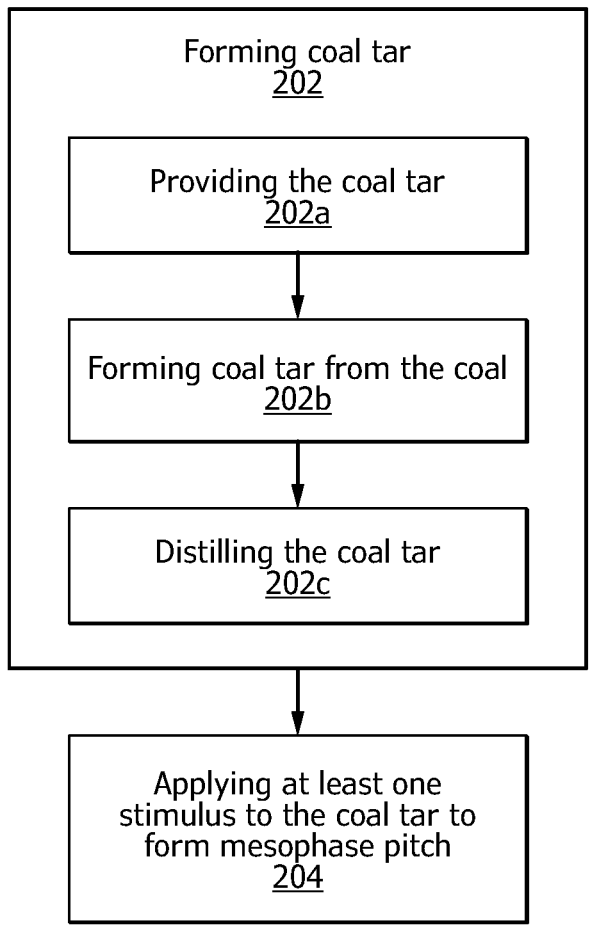
FIG. 2 is a flow chart of a method 200 of forming mesophase pitch from coal.

FIG. 2 is a flow chart of a method 200 of forming mesophase pitch, according to one embodiment. The mesophase pitch formed according to the method 200 can be suitable for forming carbon fiber. Except as otherwise disclosed, the method 200 is the same or substantially similar to any of the methods disclosed herein. For example, the method 200 can be the same or substantially similar to the method 100 except that the act of providing the coal tar includes forming the coal tar. The method 200 includes act 202, which recites "forming coal tar." The method 200 also includes act 204, which recites "applying at least one stimulus to the coal tar to form the mesophase pitch."

Act 202 can begin with subact 202a, which recites "preparing the coal." Subact 202a can be followed by subact 202b, which recites "forming coal tar from the prepared coal." Subact 202b can be followed by subact 202c, which recites "distilling the coal tar." The subacts included in act 202 are for illustration purposes. In some examples, one or more of the subacts 202a, 202b, and/or 202c can be performed in a different order, eliminated, divided into additional subacts, modified, supplemented with other subacts, or combined into fewer subacts.

Subact 202a includes preparing the coal. Preparing the coal includes preparing the coal to be transformed into coal tar. In one embodiment, subact 202a can include reducing the particle size of the coal to form a coal powder. For example, subact 202a can include reducing the particle size of the coal so the coal exhibits a particles size about 1 cm or less, about 7.5 mm or less, about 5 mm or less, about 2.5 mm or less, about 1 mm or less, about 750 µm or less, about 500 µm or less, about 250 µm or less, about 100 µm or less, about 75 µm or less, about 50 µm or less, about 25 µm or less, about 10 µm or less, about 5 µm or less, or submicron. Reducing the particle size of the coal can decrease the time and/or energy required to form the coal tar. In one embodiment, subact 202a can include sieving the coal so the coal exhibits a selected particle size or less. Similar to reducing the size of the coal, sieving the coal can ensure that the coal is free of large particles which can make forming the coal tar more difficult. In one embodiment, subact 202a includes drying the coal to remove moisture therefrom since the moisture can interfere with the efficient transformation of the coal into coal tar. In one embodiment, subact 202a includes a combination of the above embodiments.

In one embodiment, subact 202a can be omitted from act 202. For example, subact 202a can be omitted from act 202 when the coal provided already exhibits a selected particles size and/or is dried.

Subact 202b include forming the coal tar. The coal tar can be formed from the coal using any suitable method. In one embodiment, the coal tar is formed from the coal using a pyrolysis technique. In such one embodiment, the coal is heated, such as to a temperatures of about 1000° C. to about 2000° C. Heating the coal to such high temperatures can separate the coal into different constituents, such as coke, coal tar, coal gas, and other organic substances. Subact 202b includes collecting the coal tar. Subact 202b can also include collecting the other constituents of coal for other uses, thereby reducing waste and making the method 200 more efficient.

In one embodiment, subact 202b can be omitted from act 202. For example, subact 202b can be omitted from act 202 when the coal tar is provided thereby negating the need to form the coal tar.

Subact 202c includes distilling the coal tar. In one embodiment, subact 202c can first include drying the coal tar to remove water and other contaminates therefrom. In one embodiment, subact 202c includes fractionating the coal tar into different pitches for later conversion into the mesophase pitch. For example, fractionating the coal tar can include fractionating the coal tar into naphthalene, anthracene, coal tar pitch, and other pitches. In such an example, at least the coal tar pitch is subsequently used to form mesophase pitch though, depending on the parameters of the stimulus, other pitches can also be used. In one embodiment, subact 202c can include other methods of distilling the coal tar, such as hot filtration of the coal tar to remove soluble or insoluble impurities from the coal tar. In one embodiment, subact 202c can include a combination of the above embodiments. For instance, subact 202c can include drying the coal tar, fractionating the coal tar, and then further filtrating the coal tar using the hot filtration technique. In one embodiment, subact 202c can include collecting one or more contaminates removed during the distilling process for other uses, thereby reducing waste and making the method 200 more efficient.

In one embodiment, subact 202c can be omitted from act 202. For example, subact 202c can be omitted from act 202 when determined that the coal tar (e.g., the coal tar formed during subact 202b) need not be distilled.

Following act 202, the method 200 includes act 204, which recites "applying at least one stimulus to the coal tar to form the mesophase pitch." Act 204 is the same or substantially similar to the act 104 of the method 100.

In one embodiment, any of the processes disclosed herein can include, after forming the mesophase pitch, chemical and physical processing of the mesophase. The chemical and physical processing of the mesophase pitch can convert any remaining coal tar pitch that did not convert into mesophase pitch, improve the mesophase pitch, further increase the molecular weight of the mesophase pitch, functionalize or otherwise react the mesophase pitch, and/or remove contaminants from the mesophase pitch.

In one embodiment, the chemical and physical processing of the mesophase pitch can include air blowing and/or thermal treatment. In one example, the resulting mesophase pitch can be air blown in the temperature range of about 200° C. to about 400° C., more preferably a temperature range of from about 250° C. to about 350° C., or more preferably in a temperature range of about 280° C. to about 320° C. Air blowing increases the softening point of the mesophase pitch without destroying its spinnability. In one example, a thermal treatment can be applied to the mesophase pitch by heating the mesophase pitch to a temperature of about 300° C. to about 400° C., more preferably about 320° C. to about 390° C., and most preferably about 350° C. to about 380° C. to increase the softening point to approximately 280° C. Similar processes are disclosed in the article Two-step chemical conversion of coal tar pitch to isotropic spinnable pitch, Fuel Processing Technology, Volume 104, December 2012, pages 155-159, the content of which is incorporated by reference, in its entirety.

In one embodiment, the chemical and physical processing of the mesophase pitch can include subjecting the mesophase pitch to a first heat treatment in the presence of a Lewis acid catalyst followed by a second heat treatment after removal of the catalyst. Similar processes are disclosed in Japanese Patent Publication No. 53-7533, the content of which is incorporated by reference, in its entirety. In one embodiment, the chemical and physical processing of the mesophase pitch can include subjecting the mesophase pitch to a heat treatment of a pitch in an atmosphere of a flowing inert gas or under a reduced pressure. Similar processes are disclosed in Japanese Patent Publication Nos. 53-86717 and 53-86718, the content of which is incorporated by reference, in its entirety. In one embodiment, the chemical and physical processing of the mesophase pitch can include subjecting the mesophase pitch to a treatment with an organic solvent, e.g. benzene, toluene and heptane, and the insoluble fraction is heated to form mesophase. Similar processes are disclosed in Japanese Patent Publication Nos. 54-160427, 55-58287 and 55-130809, the content of which is incorporated by reference, in its entirety.

In one embodiment, any of the processes disclosed herein can include forming the mesophase pitch into carbon fibers. For example, forming the mesophase pitch into carbon fibers can include one or more of spinning the mesophase pitch into fibers (e.g., via a melt spin technique), stabilizing the mesophase pitch, graphitizing the mesophase fibers, or carbonizing the mesophase fibers.

As previously discussed, the product formed during any of the methods disclosed herein can be subjected to evaluation. As used herein, evaluation, evaluated, etc. refers to analytical methods used to test one or more characteristics of the product. Evaluating the product can determine whether one or more parameters of the stimulus applied to the coal tar can need to be changed. In one example, evaluating a product is performed before the stimulus is applied to the product (e.g., the provided coal, the coal powder, the coal tar, and/or the distilled coal tar) and such evaluation can be to select the parameters of the stimulus applied to the coal tar. In one example, evaluating a product is performed after the stimulus is applied to the product (e.g., the mesophase pitch, the spun fibers, and/or the carbon fibers) and such an evaluation can select parameters of the stimulus applied to subsequently provided coal tar.

In one embodiment, the evaluation can include determining or predicting the characteristics of the coal tar subject to the stimulus before the coal tar is subjected to the stimulus. For example, as previously discussed, certain parameters of the stimulus can be more efficient at converting coal tar exhibiting certain characteristics to mesophase pitch than other parameters. The parameters of the stimulus can be selected based on the determined or predicted characteristics of the coal tar. Further, the parameters of the stimulus can be changed when the evaluation determined or predicted that the characteristics of a newly provided coal tar is different than a previously provided coal tar. In one embodiment, the characteristics of the coal tar can be determined or predicted using a proximate and ultimate analysis. The proximate and ultimate analysis can determine or predict the moisture content, sulfur content, calorific value, volatile matter content, fixed carbon content, ash content, and elemental composition of the coal. Such values can determine how the coal tar is formed (e.g., whether the coal is dried, which contaminates to remove during act 202c) and predict the parameters of the stimulus applied to the coal. In one embodiment, the characteristics of the coal tar can be determined or predicted by sieving or otherwise determining the particle size of the coal (e.g., the coal powder) prior to act 202b. For example, coal exhibiting larger particle sizes can take more time to be converted into coal tar and/or predict the characteristics of the coal tar (e.g., whether the coal tar include non-coal tar components) formed during act 202b. In one embodiment, the characteristics of the coal tar can be determined or predicted by subjecting the provided coal, the coal tar, and/or the distilled coal tar to a thermogravimetric analysis (TGA) and/or differential scanning calorimetry (DSC"). It is noted that other techniques can determine or predict the characteristics of the provided coal, the coal tar, or the distilled coal tar other than other those provided above.

In one embodiment, the evaluation can include determining the characteristics of the mesophase pitch after the coal tar was subjected to the stimulus. Determining the characteristics of the mesophase pitch can include using UV fluorescence, high-performance liquid chromatography, and/or mass spectroscopy. As previously discussed, determining the characteristics of the mesophase pitch can change the parameters of the stimulus applied to the coal tar to improve the mesophase pitch formed. In one example, the changes to the parameters of the stimulus needed to improve the mesophase pitch based on the detected characteristics of the mesophase pitch are known. In such an example, the parameters of the stimulus are merely changed to the known parameters. In one example, the changes to the parameters of the stimulus needed to improve the mesophase pitch based on the detected characteristics of the mesophase pitch are not known. In such an example, one or more parameters of the stimulus applied to coal tar are changed. The mesophase pitch formed from such coal tar is then tested to determine if the characteristics of the mesophase pitch improved. The parameters of the stimulus can remain unchanged if the characteristics of the mesophase pitch improves a sufficient amount. However, one or more parameters of the stimulus can be changed if the characteristics of the mesophase pitch did not improve a sufficient amount, remained unchanged, or decreased.

The evaluation can include determining the characteristics of the spun fibers and/or the formed carbon fibers. For example, the evaluation can include determining the physical characteristics (e.g., tensile strength, Young's modulus, etc.) of the spun fibers and/or the formed carbon fibers using, for instance, an INSTRON machine.

In some examples, evaluating the effects of the stimulus on the coal tar during a mesophase pitch formation processes can allow for the parameters of the stimulus to be selected to enhance certain reactions during the formation process and/or to produce mesophase pitch having a certain desired composition or certain desired properties, for example properties that allow for the efficient production of high-quality graphene therefrom. In some examples where the stimulus comprises a magnetic field, the magnetic behavior of desired components of the mesophase pitch can be evaluated and the parameters of the stimulus can be selected in response. For example, it can be desirable for the pitch to include certain components, and the evaluation of the pitch after it is formed according to a stimulus having a first set of parameters can providing information to allow the parameters of the stimulus to be modified or selected to enhance one or more properties of the pitch.

In some examples, one or more properties of the pitch can be enhanced or controlled as desired by controlling the focus or location of the stimulus applied to the coal tar during the formation process. In some examples, the application of the stimulus as a centered or gradient-based field can be controlled based on the evaluation of the pitch, coal tar, or products formed therefrom. In some examples, the heating of the coal tar caused by the stimulus can be evaluated. In some examples, the local pressures of the coal tar caused by the stimulus can be evaluated. In some examples, evaluation can allow for the selection or modification of a processing temperature, as described with respect to FIG. 1, that can desirably align oligomers present in the coal tar into graphene-like aromatic structures in the subsequently formed mesophase pitch. In some examples, the parameters of the stimulus can be selected to form a pitch having a desired composition, such as including aromatic molecules like triphenylene, coronene, or any other type of desired molecule or component. In some examples, the desired components can be desired precursors for the formation of carbon products, such as carbon fibers or graphene, from the resultant pitch.

In some examples, the process steps described herein with respect to FIGS. 1 and 2 can efficiently produce mesophase pitch of a desired quality and composition from coal tar using temperatures that are low enough, and durations that are short enough to allow for the processes to be run in a continuous reactor. That is, any of the methods 100, 200 described herein can be continuously operated in one or more reactors or reaction vessels to produce a continuous output of mesophase pitch having desired properties from a continuous input of coal tar, coal, or other coal-derived precursor. In some examples, the parameters of the stimulus can be modified as described herein while the continuous process is occurring or being carried out. For example, the coal tar and/or resultant pitch can be continuously evaluated as part of a continuous reaction process and the stimulus, as well as other process parameters such as temperature or time, can be adjusted on the fly during the continuous reaction process. This ability to continuously monitor and adjust reaction and stimulus parameters during a continuous reaction process can allow for the continuous formation of mesophase pitch having desired properties while accounting for variations in the quality of the incoming coal tar or other coal-derived feedstock. This would, in turn, reduce the cost of the mesophase pitch by an order of magnitude, thereby significantly reducing the cost of carbon products formed therefrom.

Figure 3A:
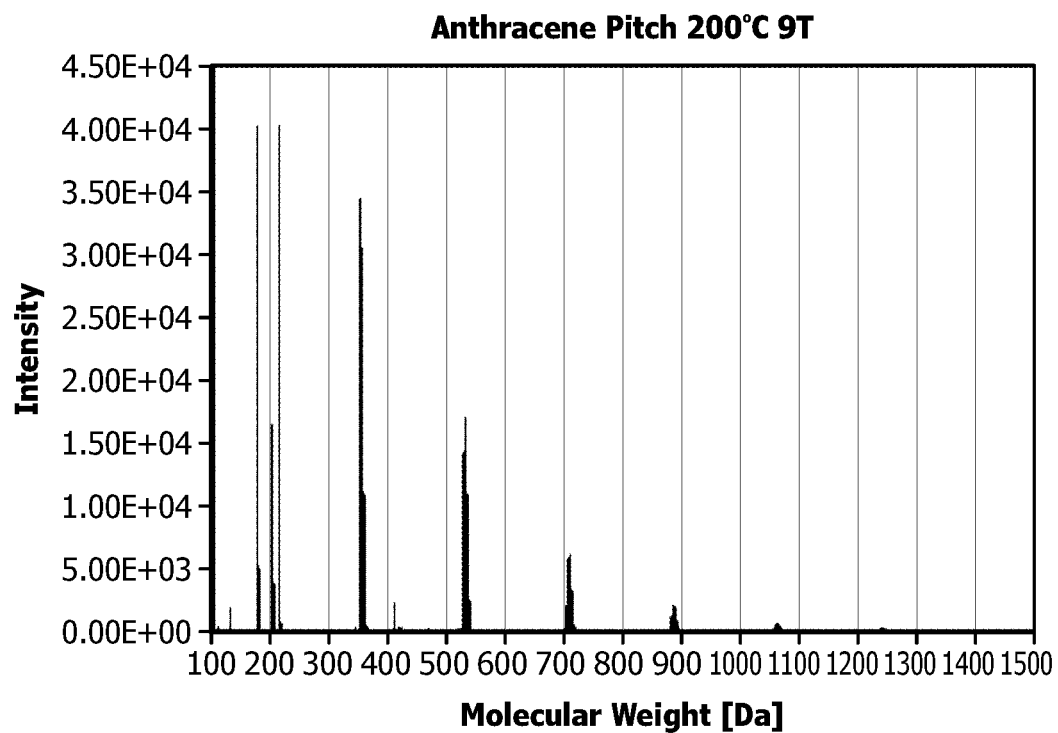
FIG. 3A shows a sample mass spectrograph of pitch formed from coal tar using a process including the application of a stimulus to the coal tar.
Figure 3B:
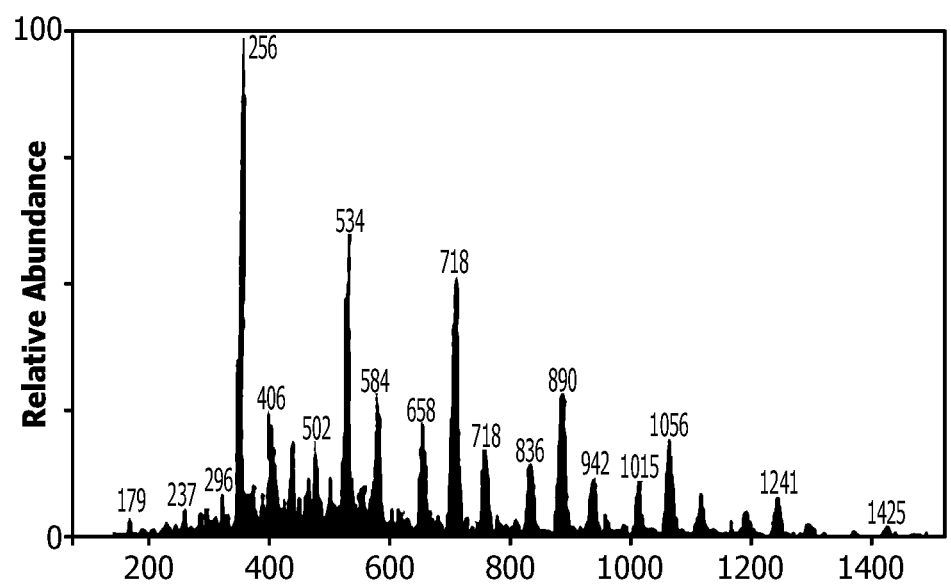
FIG. 3B shows a sample mass spectrograph of pitch formed from coal tar using a conventional thermal process.

FIGS. 3A and 3B show two sample mass spectrographs of mesophase pitch. Each mass spectrograph shows the molecular weight in Daltons (Da) of the components of the pitch along the X-axis and the relative intensity of the spectra along the Y-axis. A higher relative intensity indicates a relatively higher amount of components of the pitch having a certain molecular weight. The mass spectrograph shown in FIG. 3A was taken from a sample of mesophase pitch produced according to the processes described herein. In this particular example, coal tar was heated to about 200° C. and a stimulus comprising a magnetic field having a field strength of about 9 T was applied to the coal tar during the pitch formation process. As can be seen, there are six distinct peaks in the mass spectrograph, indicating that the coal tar was polymerized into specific components or molecules (each of which has a distinct molecular weight) while essentially no cracking of the monomers present in the coal tar has occurred. This result is indicative of a mesophase pitch having select components at high purity levels, with little to no additional components or molecules therein.

Specifically, the results show that there is little to no fractionalization or methylation of the molecules in the pitch. Without wishing to be bound by any one theory, it is believed that this non-methylated pitch will yield a more graphitic structure when graphitized, thus improving the properties of the products requiring a graphitic structure. In contrast, the mass spectrograph shown in FIG. 3B includes a larger number of peaks at various molecular weights, as well as significant broadening of the peaks, and multiple sub-peaks disposed between each of the relatively more intense primary peaks. These results are indicative of a pitch that includes a much larger variety of component molecules at a variety of concentrations, some of which may be undesirable for the subsequent formation of carbon products from the pitch. Additionally, the presence of multiple smaller and broader peaks is indicative of a significant amount of cracking of the monomers of the precursor coal tar. The cracking of these monomers and the presence of undesirable components in the pitch means that this pitch will be less efficient at forming graphene or other carbon products as compared to the pitch analyzed in the mass spectrograph of FIG. 3A. That is, the resultant graphene yield of the pitch analyzed in the mass spectrograph of FIG. 3B will be significantly lower than the graphene yield of the pitch analyzed in the mass spectrograph of FIG. 3A, The pitch analyzed in the mass spectrograph of FIG. 3B was formed by conventional methods that do not include the application of a stimulus and at a temperature of 400° C. Thus, even with a much higher processing temperature, conventional methods still result in the formation of pitch that does not have desired properties as compared to pitch formed according to the processes described herein.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for forming mesophase pitch, comprising:
    continuously providing coal tar to a reactor;
    applying a stimulus to an amount of the coal tar, the stimulus selected from the group consisting of at least one of an electromagnetic field ("EMF") or a magnetic field, wherein applying the stimulus to the amount of coal tar heats the amount of coal tar to a temperature of from about 100° C. to about 300° C.; and
    continuously forming mesophase pitch from the coal tar.

2. The method of claim 1, further comprising forming the amount of coal tar by at least one of:
    reducing a particle size of an amount of coal to form coal powder;
    sieving the coal powder;
    pyrolyzing the amount of coal and extracting the amount of coal tar from the pyrolyzed coal; or
    distilling the amount of coal tar to remove one or more contaminants therefrom.

3. The method of claim 1, wherein the stimulus comprises the EMF.

4. The method of claim 3, wherein the EMF has a wavelength of from about 1 mm to about 1 m.

5. The method of claim 3, wherein the EMF comprises a pulsed EMF.

6. The method of claim 3, wherein applying the stimulus to the amount of coal tar comprises:
applying a first EMF to the amount of coal tar, the first EMF having a first property; and
applying a second EMF to the amount of coal tar, the second EMF having a second property that is different from the first property.

7. The method of claim 1, wherein the stimulus comprises the magnetic field.

8. The method of claim 7, wherein applying the stimulus to the amount of coal tar comprises varying a magnetic field strength of the magnetic field.

9. The method of claim 1, further comprising:
evaluating a characteristic of the amount of coal tar or the mesophase pitch; and
changing a parameter of the stimulus applied to the amount coal tar in response to evaluating the characteristic of the amount of coal tar or the mesophase pitch.

10. The method of claim 1, further comprising forming the mesophase pitch into graphene, fullerene, diamond, or carbon fibers.

11. The method of claim 1, further comprising air blowing the mesophase pitch.

12. The method of claim 1, further comprising subjecting the mesophase pitch to a thermal process.

13. A method for processing coal tar, comprising:
evaluating a characteristic of an amount of coal or an amount of coal tar formed from the amount of coal;
selecting one or more parameters of a stimulus in response to evaluating the characteristic; and
applying a stimulus having the one or more parameters to the amount of coal tar to form mesophase pitch, the stimulus selected from the group consisting of at least one of an electromagnetic field ("EMF") or a magnetic field, wherein applying the stimulus to the amount of coal tar heats the amount of coal tar to a temperature of from about 100° C. to about 300° C.

14. The method of claim 13, wherein:
the stimulus comprises the EMF; and
selecting one or more parameters of the stimulus comprises selecting from the group consisting of at least one of a wavelength, an intensity, or mode of the EMF.

15. The method of claim 14, wherein the EMF has a wavelength of from about 1 mm to about 1 m.

16. The method of claim 13, wherein:
the stimulus comprises the magnetic field; and
selecting one or more parameters of the stimulus comprises selecting from the group consisting of at least one of a magnetic field strength or mode of the magnetic field.

17. A method for forming mesophase pitch, comprising:
applying a stimulus to a first amount of coal tar to form a first amount of mesophase pitch, the stimulus selected from the group consisting of at least one of an electromagnetic field ("EMF") or a magnetic field, wherein applying the stimulus to the amount of coal tar heats the amount of coal tar to a temperature of from about 100° C. to about 300° C.;
evaluating a characteristic of the first amount of mesophase pitch;
changing a parameter of the stimulus in response to evaluating the characteristic of the first amount of mesophase pitch; and
applying the stimulus exhibiting the changed parameters to a second amount of coal tar to form a second amount of mesophase pitch.

18. The method of claim 17, wherein:
the stimulus comprises the EMF; and
the parameter of the stimulus consists of at least one of a wavelength, an intensity, or mode of the EMF.

19. The method of claim 17, wherein:
the stimulus comprises a magnetic field; and
the parameter of the stimulus consists of at least one of a magnetic field strength or mode of the magnetic field.

* * * * *